April 12, 1966     J. H. BAUML ETAL     3,245,440
APPARATUS FOR SAWING WALL-BOARD SHEETS
Original Filed May 7, 1962     4 Sheets-Sheet 1

INVENTORS
JOHANES HANS BAUML,
SVEN MARTIN JONSON,
BY Pierce, Scheffler & Parker
their ATTORNEYS April 12, 1966   J. H. BAUML ETAL   3,245,440
APPARATUS FOR SAWING WALL-BOARD SHEETS
Original Filed May 7, 1962   4 Sheets-Sheet 3

INVENTORS
JOHANES HANS BAUML,
SVEN MARTIN JONSON,
BY Pierce Schiffler & Parker
their ATTORNEYS

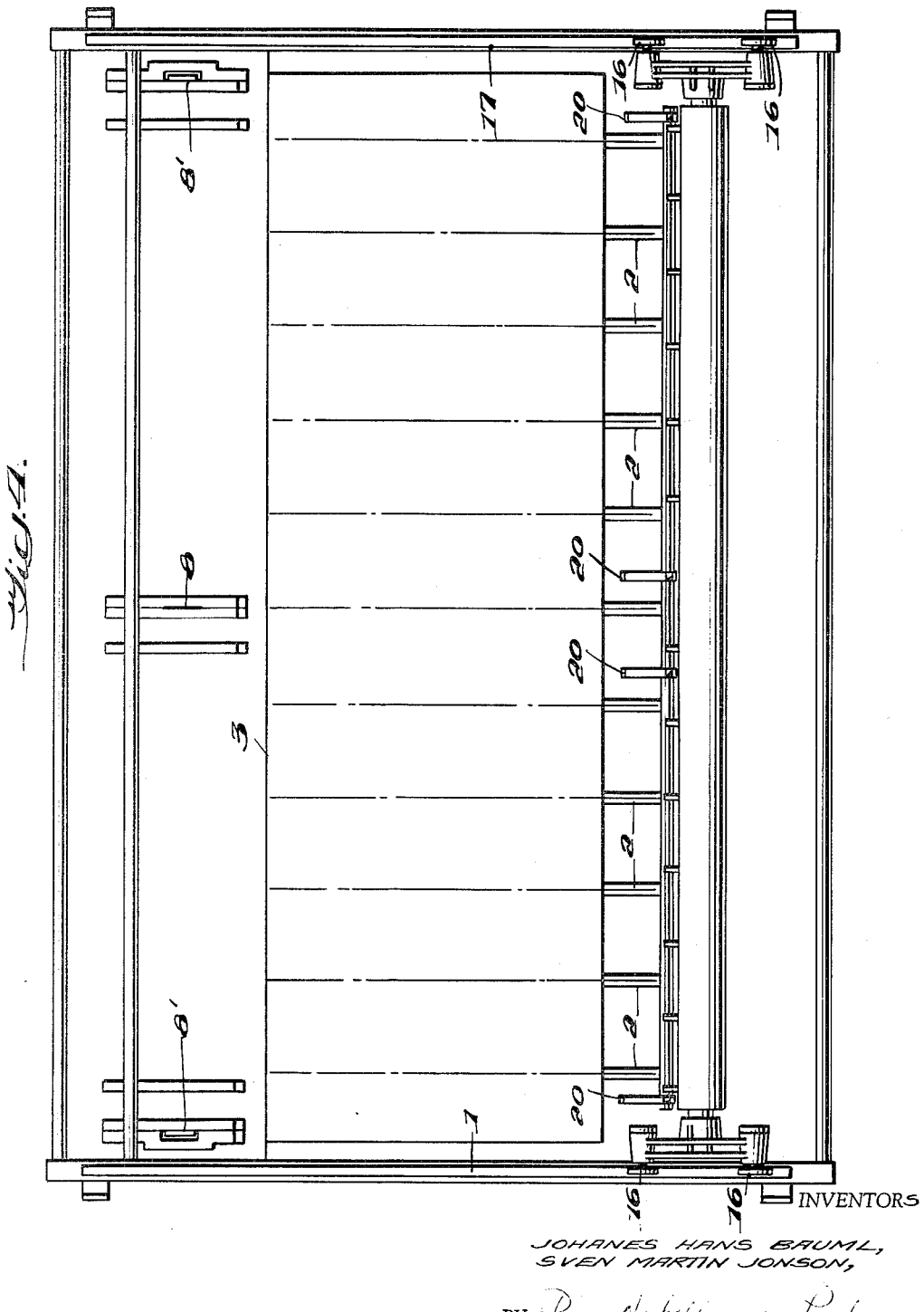

United States Patent Office 3,245,440
Patented Apr. 12, 1966

3,245,440
APPARATUS FOR SAWING WALL-BOARD SHEETS
Johannes Hans Bauml and Sven Martin Jonson, Sundsvall, Sweden, assignors to Aktiebolaget Mohogs Mekaniska Verkstad, Sundsvall, Sweden, a company of Sweden
Continuation of application Ser. No. 207,135, May 7, 1962. This application Mar. 8, 1965, Ser. No. 444,889
Claims priority, application Sweden, May 9, 1961, 4,910/61
3 Claims. (Cl. 143—52)

This is a continuation of our application Serial No. 207,135, filed May 7, 1962, now abandoned.

This invention relates to an apparatus for the sawing of wall-board sheets and the like, of the type which comprises a sawing-table, a number of saw-blades which are arranged on one side of said table, and which are adjustable sideways so as to permit the sawing plates or sheets of differing shapes and sizes, as well as a feeding device for moving the sheets forward during the sawing. In particular the invention is concerned with a sawing device of the sort where a sheet is fed lengthwise along the sawing-table, from which it is moved sideways so it can be divided by the saw-blades. This sheet, when brought into position on the table, need not consist of one unbroken sheet, but can, before feeding on to the table, have been divided along its length, so that it consists of a number of part sheets which are thus fed simultaneously lengthwise along said table.

In sawing apparatus of this sort it is important that the sheets are fed past the blades of the saws exactly in unison and with their front and rear ends exactly at right angles to the direction of the feeding motion. It is also important that the feeding means for the sheets during sawing are so constructed that they do not collide with the saw-blades, which must be adjustable sideways to make it possible to saw any desired size. One known sort of feeding means consists of endless chains equipped with feeding fingers which engage on the rear ends of the sheets looking in the direction of movement. However, it has been found that said feeding means cannot guarantee the desired precision, since the chains tend to become stretched in time. In addition, it is troublesome to move this feeding means sideways.

The invention aims at producing a sawing device where the feeder guarantees an absolutely even and exact feeding movement of the sheets during sawing, and where the feeder can, when changing from one size to another, easily be moved sideways to any desired position and so that it does not collide with the saw-blades. The device according to the invention is characterized in that the feeding means consists of a carriage which is situated above the sawing-table, and which is equipped with a number of feeding-arms which are arranged to engage on the rear end of the sheets, looking in the direction of motion, with said feeding-arms so arranged that, depending on the positions of the saw-blades, they can be varied so that the feeding arms follow a path which takes them between the saw-blades, the saw-blades being situated substantially below the plane of the sawing-table.

The invention will be described below in more detail by reference to the accompanying drawings.

FIGURE 4 is a simplified top plan view of the apparatus.

FIGS. 5a, 5b and 5c illustrate how the device of FIGURE 4 operates in connection with the formation of a horizontal spacing between two sheets, while FIG. 6, illustrates the invention in connection with the formation of a vertical spacing between two sheets.

Figure 1:
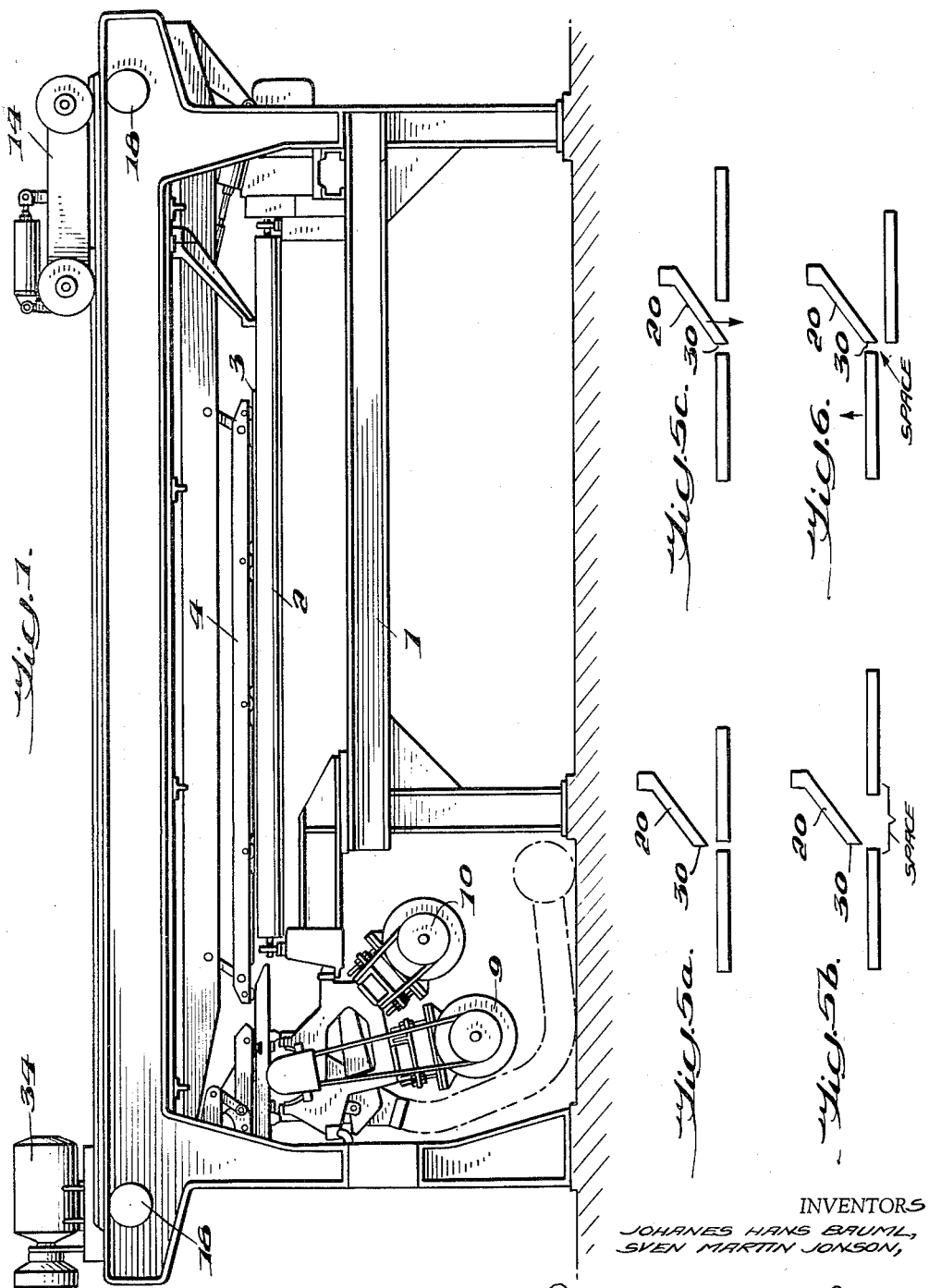
FIGURE 1 shows an embodiment of the apparatus according to the invention.

The apparatus according to the drawings consists of a machine stand 1, which bears a sawing-table consisting of a plurality of rollers 2 parallel to each other and running substantially the full length of the table. Above the table there is a hold-down means 4 equipped with wheels, which is intended to hold the sheets 3 firmly in the correct position on said table and which by means of arms 5 and 6 can be raised and lowered by the operation of a hydraulic or pneumatic piston and cylinder 7.

Figure 2:
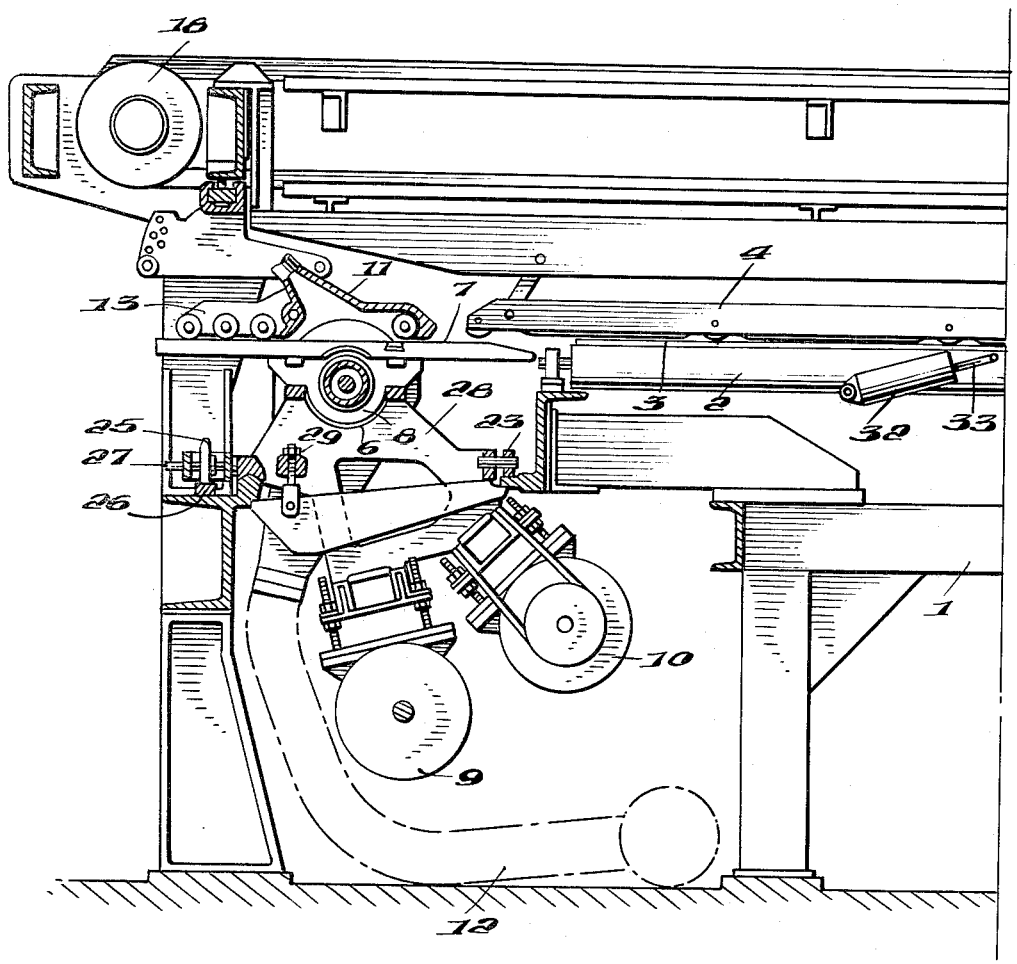
FIGURE 2 shows on a larger scale the left portion of the apparatus of FIGURE 1.
Figure 3:
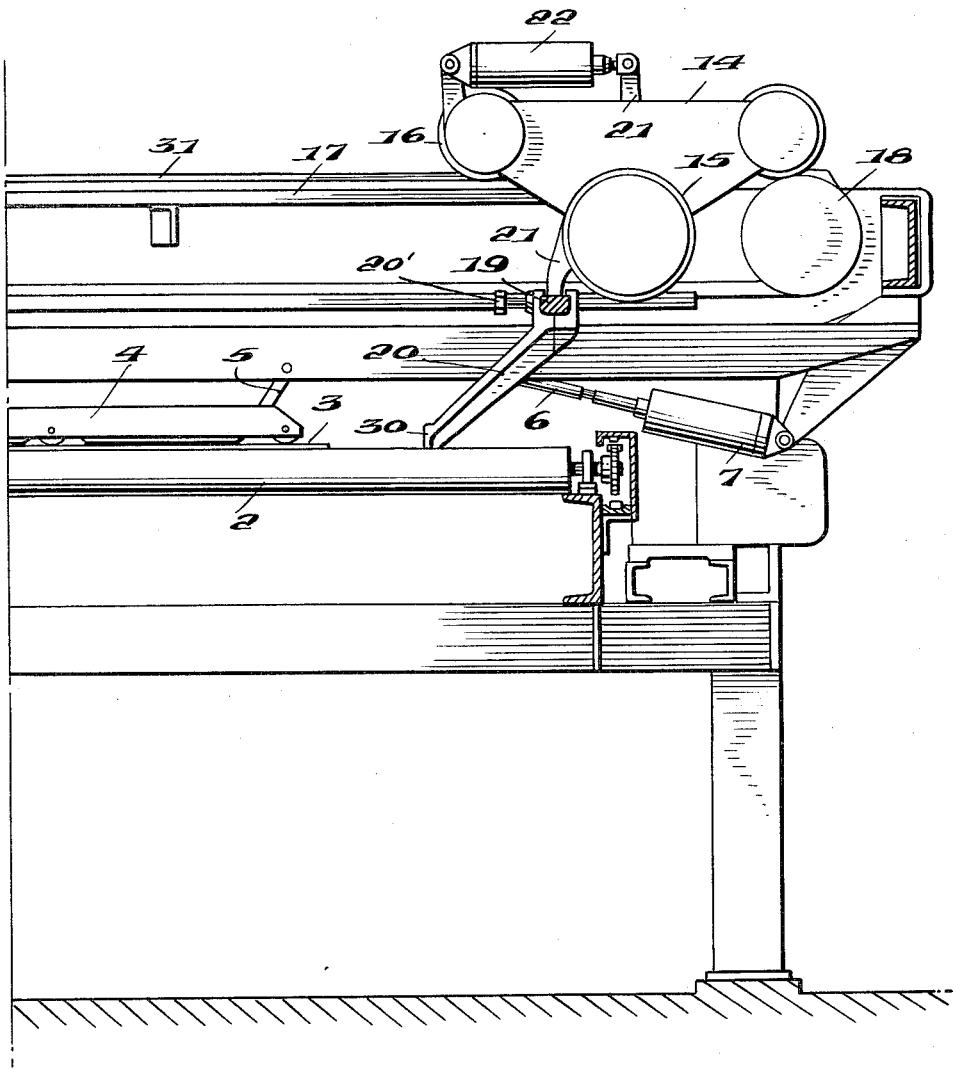
FIGURE 3 shows on a larger scale the right portion of the apparatus of FIGURE 1.

On one side of the sawing-table a number of saw blades 8 are arranged and these are driven by separate electric motors 9, 10. In order to ensure that the saw-blades may be placed close together these motors are displaced relative to each other so that motor 9 is placed in one row and motor 10 in another row (see FIGURE 2). Each blade with the motor belonging to it is supported by a carriage 28 which can be moved sideways on the machine by means of a wheel 23 and a rail 24. The carriage is moved by rotating the axle 27 on which there is arranged a cog-wheel 25 which engages on a gear-rack 26 fixed on the stand. The carriage is locked in the desired position by a bolt 29 equipped with nuts.

The saw blades are situated substantially below the plane of the rollers 2, 2 constituting the sawing-table. The top portions of the blades project above said plane and are covered by protecting casings 11 which are connected to a suction pipe for the removal of the sawdust. There are also suction means 12 provided on the underside of the saw-blades. Adjacent the saw-blades there is a hold-down means 13 equipped with wheels which are used for holding those parts of the sheet which have passed the saw-blades.

Above the sawing-table there is a carriage 14. This carriage has a lengthwise running stand in the shape of a pipe 15 and the length of the carriage is about the same as that of the sawing-table. The carriage has wheels 16 running on rails 17. So as to give the carriage a fixed position it is preferable that one of the pairs of wheels has a wedge-shaped profile and that the rail belonging to said wheels has a corresponding profile. A lengthwise-running girder 19 is fixed on the carriage and on this girder there are a plurality of arms 20 which are adjustable along the girder, and which may be secured in every desired position. The arms are equipped with vertical faces 30 which are arranged so as to come into contact with the rear ends of the sheets and feed them forward during the sawing. The girder 19 is mounted on bellcrank levers 21 which are operated by means of hydraulic or pneumatic pistons 22, thus enabling the feeding arms 20 to be raised from the active position shown to a non-operating position. The carriage 14 can be driven in both directions by means of endless chains 31 which run over chain wheels 18, one of which is driven by a motor 34, see FIG. 1.

According to FIG. 4, a sheet 3 is to be sawn into two parts by a central saw blade 8, and the edges are to be trimmed by two outer saw blades 8', 8'. The sheet is supported by the saw table consisting of rollers 2, and the rear edge of the sheet is pushed forward by four feeder arms 20, carried by the "girder" 19 belonging to the carriage, the essential parts of which are a tube 15 and four wheels 16 running on rails 17. In this particular case four feeder arms 20 are sufficient, two for each part sheet, but in case the sheet is to be sawn into several parts a plurality of feeder arms are provided on "girder" 19, so that each part sheet is pushed forward by at least two feeder arms.

The apparatus thus described works as follows. A sheet 3 is fed onto the sawing-table at right-angles to the plane surface of the drawings. The hold-down means 4 is lowered so as to hold the sheet on the table. The carriage 14 is set in motion so that the feeding-arms 20 push the sheet past the saw blades. Owing to the fact that the feeding-arms 20 move above the plane of the sawing-table, whereas the saw blades are situated substantially below said plane, the feeding-arms can pass between the upper portions of the saw-blades without colliding with them. When the sheet is sawn the carriage is moved backwards, and simultaneously the feeding arms 20 are held up off the table, which means that a new sheet can be fed onto the table while the carriage is being moved back.

FIG. 5 explains how the device operates. Part (a) shows two sheets and a feeding arm. In part (b) of this figure the sheet which is not to be sawn has been pushed back by members "32" and "33" of FIG. 2. On part (c) of this figure the feeding arm has been lowered into the horizontal space between the two sheets, and is in position to push the left hand sheet forward to be sawn.

According to FIG. 6, which shows two sheets and a feeding arm, the left hand sheet has been lifted, thereby producing a vertical spacing between the two sheets shown in part (a) of FIG. 5, with the result that the feeding arm is in position to push the left-hand sheet forward to be sawn.

An apparatus of the sort described is often preceded by an apparatus for sawing the sheets along their lengths, which optional additional apparatus, as such, forms no part of the present invention. The part sheets are thereafter fed onto the sawing-table at the same time. If these sheets are all to be sawn across the sawing is carried out as described above. Sometimes, however, one or more of the part sheets lying next to each other are to be sawn across, while one or more need no further sawing. The feed-arms 20 must then leave one or more part sheets on the sawing-table. To enable this to be done the apparatus according to the drawing is equipped with a hydraulic or pneumatic cylinder 32 fixed under the table, said cylinder having a piston equipped with a feeding-arm 33 which is arranged to lift the front end of the part sheet which is not to be sawn and push it backwards. This creates a space between the part sheets which are to be sawn and those which are not to be sawn. The carriage 14 is brought forward with the feeding arms in the raised position and the arms are lowered to the operating position so that the working-face 30 falls into the space mentioned, after which the sawing is carried out as described above.

In the embodiment illustrated the feeding-arms 20 project downwards somewhat below the surface of the sawing-table, that is to say, the plane which is defined by the upper surfaces of the rollers 2. This means that one cannot place a feeding-arm exactly above a roller. One can, however, especially when sawing thick sheets, make the feeding-arms so that they end somewhat above the plane of the sawing-table, in which case the feeding-arms may be moved sideways independently of the sawing-table.

The adjustment of the feeding-arms sideways takes place in the embodiment shown through the arms being moved and fixed in the desired position on the girder 19. In addition to this individual mobility of the feeding-arms, they could, of course, all be movable up or down, as is shown in the drawing, so as to be brought into a non-operating position during the return journey of the carriage.

By designing the feeding means according to the invention one is given a guarantee that the operating faces 30 of all the feeding-arms are always on the same plane relative to each other.

We claim:
1. An apparatus for sawing wall-board sheets and the like comprising
   a sawing-table for supporting sheets while being sawn;
   a carriage arranged for reciprocating motion above the sawing table;
   a girder mounted horizontally on said carriage;
   a plurality of feeding arms extending from said girder in a downward-forward position and slidably mounted on said girder and fixable in any desired position, on the lower ends of said feeding arms substantially vertical surfaces to engage the rear edges of such sheets;
   means for feeding sheets to the sawing-table;
   means for pressing such sheets against the sawing-table for preventing lateral movements of such sheets;
   a plurality of circular saw blades mounted with their axes below the sawing-table, said saw blades being laterally movable and adapted to be fixed in any desired position;
   and means for holding such sheets after having passed the saw blades to prevent lateral movements of such sheets.

2. Apparatus as defined in claim 1, further characterized in that said means for feeding sheets to the sawing table comprises a plurality of mutually parallel rollers whose axes are perpendicular to the axes of the saw blades.

3. Apparatus as defined in claim 1, further characterized in that said saw blades are driven by separate motors, each saw blade and its associated motor being mounted as a unit on a carriage laterally movable with respect to the plane of the saw blade.

References Cited by the Examiner
UNITED STATES PATENTS

| | | | |
|---|---|---|---|
| 258,377 | 5/1882 | Clark | 198—221 |
| 1,348,389 | 8/1920 | Barrett | 143—51 |
| 1,761,096 | 6/1930 | Tower. | |
| 2,980,234 | 4/1961 | De Koning | 143—48 X |

WILLIAM W. DYER, JR., *Primary Examiner.*

W. D. BRAY, *Assistant Examiner.*